July 18, 1967
J. R. McCONNELL
3,331,939
STRUCTURAL STEEL FABRICATING PROCESS
Filed March 15, 1963
3 Sheets-Sheet 1
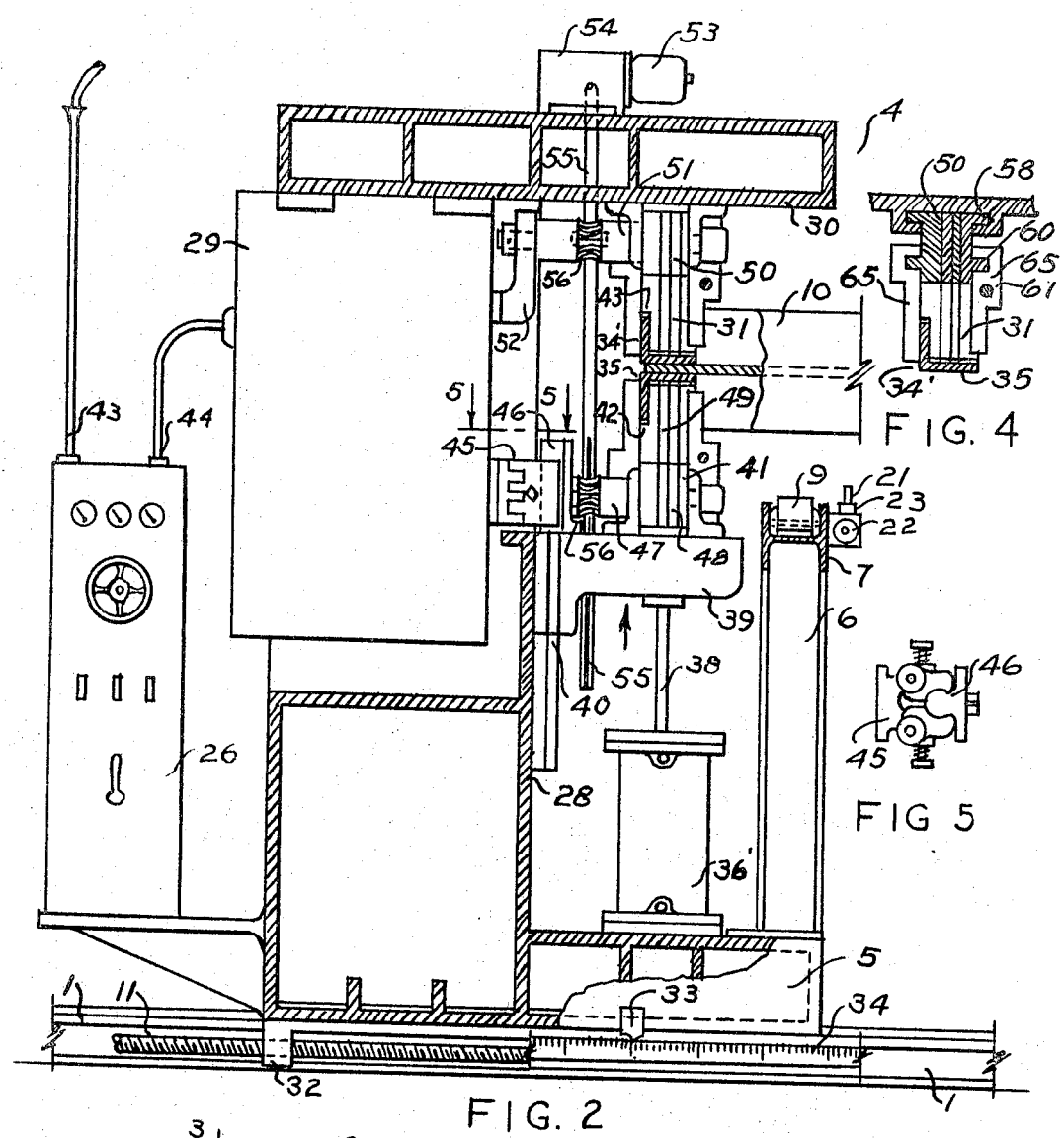
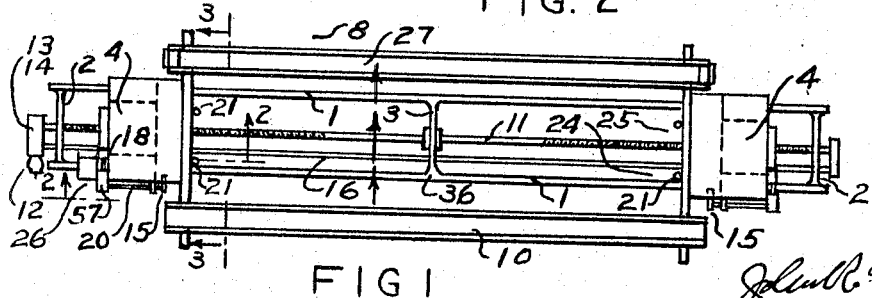
INVENTOR.
John R. McConnell INVENTOR.
John R. McConnell

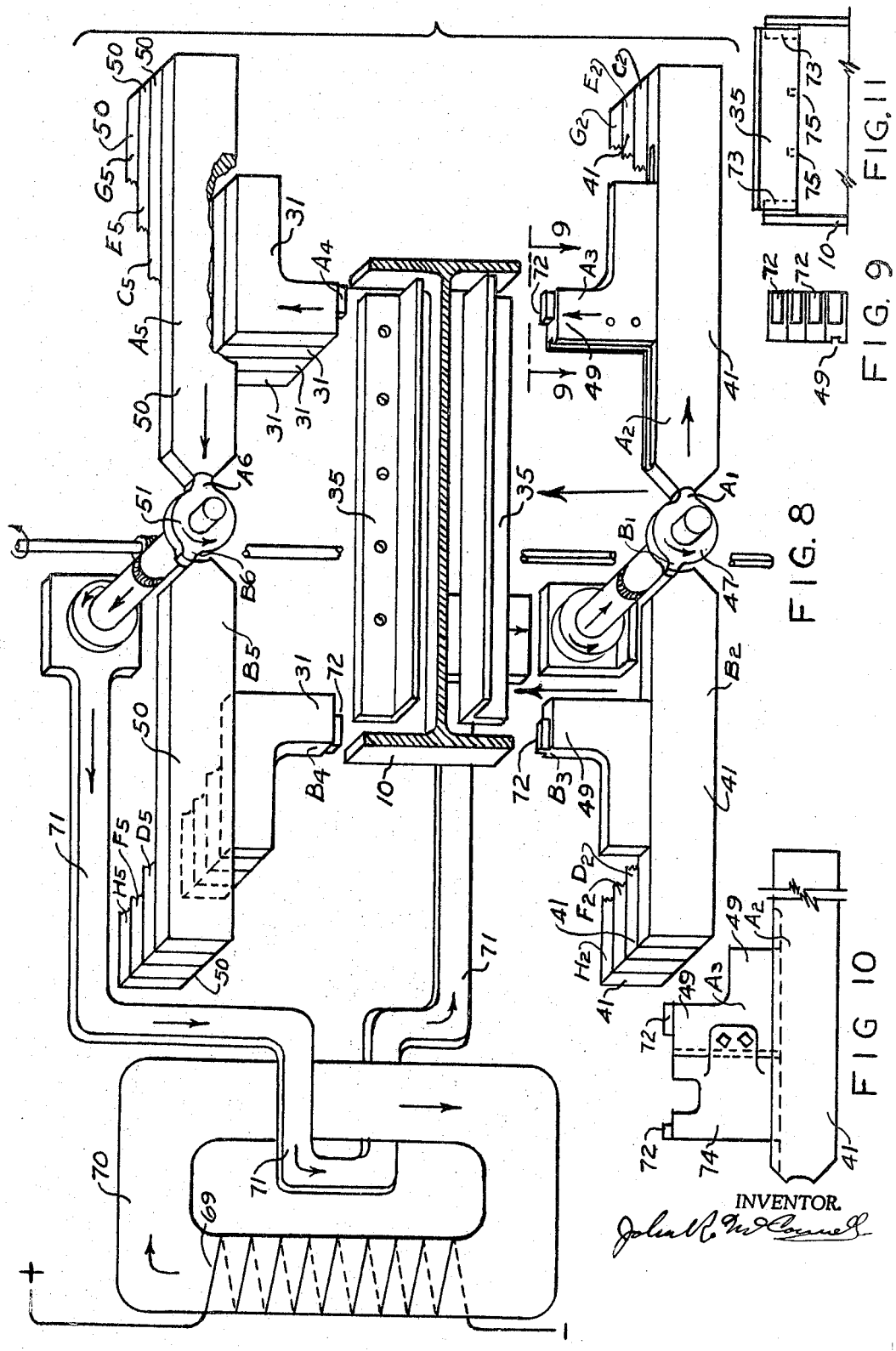

United States Patent Office 3,331,939
Patented July 18, 1967

3,331,939
STRUCTURAL STEEL FABRICATING PROCESS
John R. McConnell, 148 Woodside Ave.,
Ridgewood, N.J. 07450
Filed Mar. 15, 1963, Ser. No. 265,519
2 Claims. (Cl. 219—78)

This invention relates to an electric resistance welding apparatus for the fabricating of structural steel members.

The primary objective of the present invention is to set forth an automatic apparatus for the rapid welding of connection details to structural beams and girders.

It is also an objective to provide means to convey the structural shapes, generally of I or H form, into position between the dual welding heads; to converge the structural elements and the welding heads; into the co-ordinated welding position; to weld the structural elements; to release the completed member; and to convey the same to discharge.

Another objective is to provide means for length centering the structural shape in proper longitudinal relation to plural welders; to measure the length of the shape; to completely lay out the member with the connection details precisely located thereon; and to produce a completed member of precise overall length from a raw shape of random length.

An objective is to provide a mobile and quickly adjustable apparatus which will fabricate members of any length, depth, size, and weight; producing connections of superior strength in a single headling of the material.

An important objective is to provide a machine which requires a small instantaneous current demand with a high power factor that, creates a minimum disturbance in the electric distribution system.

For other objects and for a better understanding of the invention, reference may be had to the following detailed description, taken in conjunction with the accompanying drawings, in which:

FIGURE 1 is a plan layout of a transverse feed beam fabricating apparatus showing two end welders.

FIGURE 2 is a longitudinal section on end welder taken on FIGURE 1.

FIGURE 3 is an end view of welder, partly in section, taken on FIGURE 1.

FIGURE 4 is a cross-section of the insulated current-supplying bus bars taken on FIGURE 3.

FIGURE 5 is a plan view of the sliding knuckle connection supplying welding current to the lower welding head taken on FIGURE 2.

FIGURE 8 is a schematic diagram showing the electric primary and secondary welding circuit through the transformer and across the three contacting structural elements.

FIGURE 9 is a plan view of the welding lugs on sectionalized individual elements of the two part welding head, taken on FIG. 8.

FIGURE 10 is an elevation of an attachment to the welding head elements to weld spots nearer to the mid-depth of the shape.

FIGURE 11 is a detail showing a completed weld at one end of the member.

Figure 7:
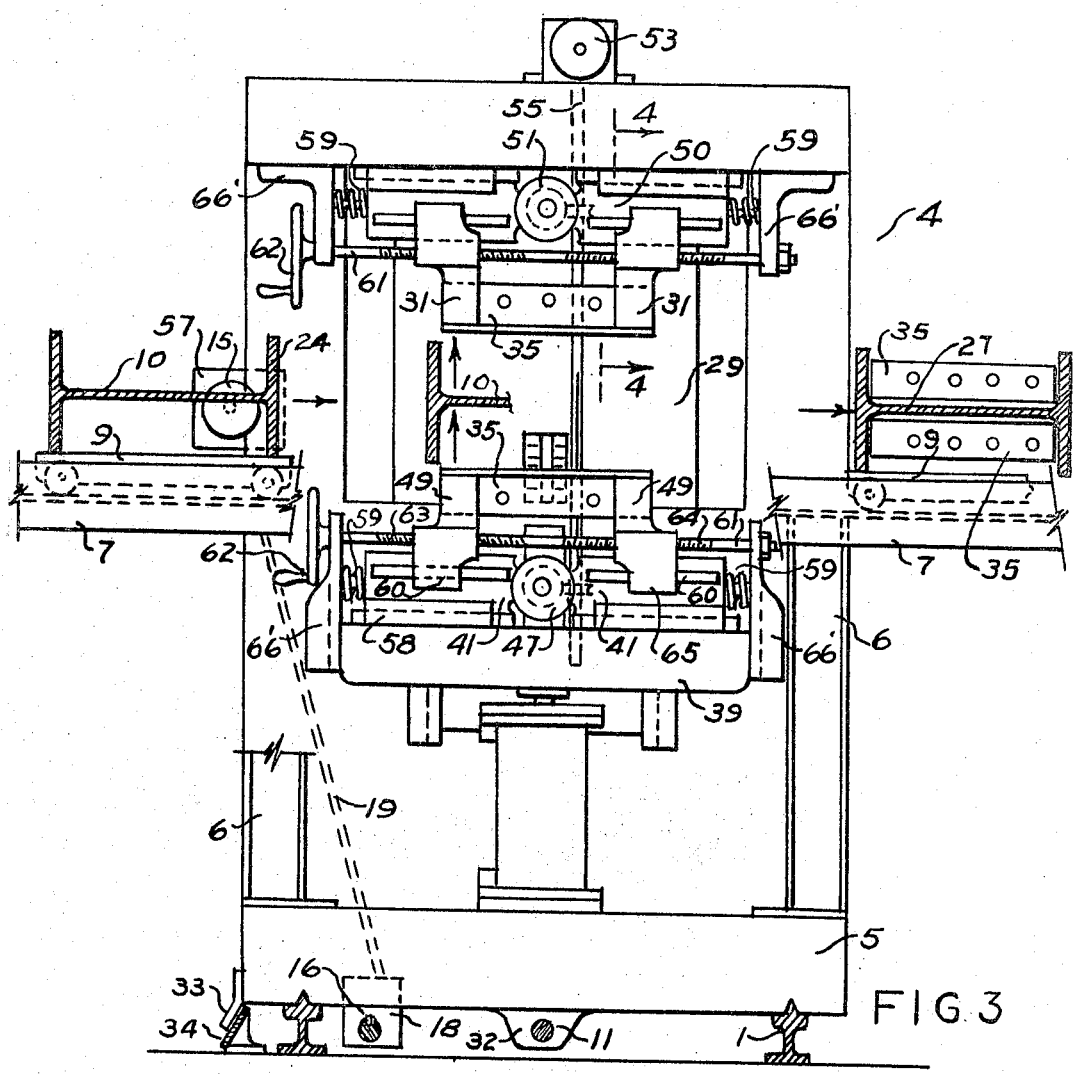
FIGURE 7 is a cross-section of the distributor with abutting bus bars taken on FIGURE 6.

The illustrated and described invention set forth herein solves in a technical, practical and economic way the rapid and automatic production of a finished member of precise dimensions and superior strength by a single mechanical handling of materials.

Thus in said description: FIGURE 1 shows a plan view of an integrated co-acting fabricating apparatus. Longitudinally extending laterally spaced rails 1 are tied together at their ends 2 and at mid-length by cross ties 3. Equidistantly spaced from the mid-length tie, which constitutes a longitudinal anchorage 3 for certain shafts described hereinafter, are paired opposed C frame resistance welders 4. On the inward edge of the welder base 5, posts 6 support an H-shaped transverse rail 7 that is slightly pitched downwardly from feed position to discharge 8. In the upper trough of the H, light buggies 9 support and convey the shape 10 by gravity through the apparatus from feed position to operating position to discharge. The mobile welders 4 are slidably mounted on the said rails 1 and are longitudinally guided by same. A shaft 11, located midway between rails 1 and extending the length of the apparatus, is longitudinally anchored at the mid-length anchorage and transverse measuring axis 3. The shaft is threaded at opposite ends by single right and left threads.

Said relocating shaft 11 is threaded through the bases 5 of welders. On actuation of the reversible motor 12, speed reducer 13 and gear box 14 at the left, the rotatable shaft 11 equally converges or diverges the twin welders from the middle anchorage 3. Opposed plungers 15 located above the near side of the bases are symmetrically converged inwardly to length center, the shape 10, that is next to be fabricated. Said plungers are simultaneously and equally actuated by a longitudinally keyed shaft 16 extending the length of the apparatus and located inside the near rail. See also FIG. 3. A gear 17, housed in the fabricator base 5, is slidably keyed to the said primary shaft 16, which, upon rotation of the shaft by motor 12, gear box 18 and gear shift, actuates a train of gears and shafts 19 and 20 connected to the longitudinally projectible plungers. Reverse rotation of the primary shaft retracts the plungers. Stop pins 21, transversely adjustable by hand wheel 22 and threaded shaft and vertically projectible by a solenoid 23, arrest the transverse movement of the shape successively at the length centering position 24 and the welding location 25. Console 26 controlling the operations is mounted at the left end of the welder. A raw shape 10 and fabricated member 27 are shown on the transverse transport rail buggies 9.

FIGURE 2 shows a longitudinal cross-section of the welding unit consisting of an inwardly projecting base 5, with a back wall 28 housing a transformer 29 in a hollow of the wall. Said wall terminates in a top that forms an inwardly projecting fixed platen 30 for the support of the upper welding head 31. The base is supported on and is longitudinally guided by rails 1. It is relocated by the shaft 11 threaded through the lug 32 on the underside of said base. A pointer 33, affixed to the front of base 5 overhanging a scale 34 attached to rail 1, indicates the distance the outside faces 34′ of connection angles 35 are from the mid-length anchorage and transverse zero measuring axis 3. The zero 36 of said scale is located transversely opposite the mid-length anchorage 3. The distance measured on said scale is half the overall length member.

On the inward edge of the base, posts 6 support the transverse transmission rail 7 and buggies 9 with the main shape 10 thereon. The solenoid 23 operated stop pin 21 is shown mounted on the transmission rail 7, with the hand-wheel 22 adjustment mechanism for various depths of shapes. Inward of this, on the base, a compressed air cylinder 36′, piston 37 and piston rod 38 are connected to a vertically elevatable platen 39 T-keyed 40 to the back wall 28. Admission of air to the cylinder raises the platen equipped with the lower welding head 41. Said head, with a dual connection angle in slot 42 in the head, raises the shape off the buggy 9 up against the dual connection angle held in the slot 43 of the upper welding head.

Control console 26, equipped with necessary switches, dials, levers and adjusting devices, is located on a bracket on the outside face of the back wall. The details of the controls and their circuits, timing devices, and protection equipment will not be set forth as there are many varied systems that may be employed. Many of these are set forth in standard reference works on resistance welding, notably the American Welding Society Handbook. One system, peculiarly adapted to the objectives of this welding, is the three-phase primary system converted to direct current with the use of ignitron tubes, which gives a favorable load factor. With large amounts of metal in the throat of the welder, the use of D.C. current appreciably reduces the impedance of the welding circuit. The primary current feeds into the left side 43 of the control console and out the right side 44 to the transformer 29.

The secondary welding current flows out of the lower part of the transformer through a multiple-leaved sprung knuckle connection 45 to a three-quarter round mating terminal post 46 located on the lower platen 39. Refer also to FIG. 3. A multiple lug-cam distributor 47 contacting above terminal post 46 successively transmits the current by means of plural insulated sandwiched bus bars 48 to sectionalized elements 49 of the lower welding head 41 by means of protuberances on said head. Current flow consecutively through individual localized areas of the three contacting pieces of steel to a similar upper welding head 31, multiple bus bars 50 and distributor 51, completing the circuit through the transformer 29 by means of a bracket connection 52 at the upper leg of the welding circuit. On converging of the heads a motor 53 and speed reducer 54 rotate a splined drive shaft 55, which through gears 56 rotates the dual synchronized distributors providing a direct localized welding path across the plural steel elements.

The heating of each pair of the plural elemental areas is intermittent and consecutive until the steel reaches a welding temperature. At this time pressure is applied to forge the weld, all areas being welded simultaneously. The action of the paired cam-type lugs of the coordinated distributors transmits an intermittent consecutive pulsating current through each of the plural pairs of matched localized areas of the die blocks, creating a gradually increasing current flow that rises to a peak and gradually diminishes.

Figure 6:
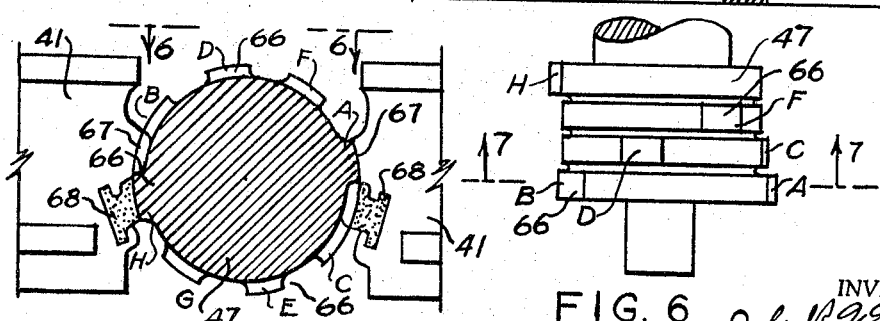
FIGURE 6 is a plan view of the rotating distributor which alternately supplies current to the individual bus bars, taken on FIG. 7.

The current flow is continuous, effecting intermittent, consecutive pulsation heating and simultaneous welding of spaced plural areas. Refer to FIGS. 6, 7 and 8.

FIGURE 3, a face view of the operating end of the welding unit, shows the welder mounted on the supporting rails, the relocating shaft 11, the location pointer 33 and measuring scale 34, the keyed shaft 16 for projection of length centering plunger 15, gear box 18 with shaft 19 and the length centering plunger with gear box 57 mounting. Posts 6 support the shape transmission rail 7 carrying buggies 9. One shape is shown being length centered, with another progressing to discharge. A line engraved on the plunger shaft back of the head indicates on an adjacent scale one-half the amount the raw shape is shorter or longer than the finished length of the member. Refer also to FIGS. 1 and 2. Machine is shown open to receive a shape for the fabricating-welding operation. On the lower platen, the multiple sandwiched bus bars are shown T-keyed 58 to the top surface.

At the center of platen 39, the rotating distributor 47 is shown with the semi-circular ends of the oppositely located bus bars 41 in close contact with said distributor. The bus bars are held transversely in position by end located compression springs 59. Each transversely adjustable, two-part, welding die-head 49 is keyed 60 to the bus bars, maintaining close electrical contact with the top uninsulated surfaces of same. A shaft 61, rotated by a hand-wheel 62 with single right 63 and left threads 64 at either end, threaded through the enclosing bodies 65 of the two-part head 49, converges or diverges same to fit the various depths of shapes being fabricated. Brackets 66', on the ends of platen 39, support and anchor the adjusting screw lengthwise. In the upper contact face of the head 31, a slot 42 is provided, to receive, hold and move to the web of the shape the required connection angle 35, for resistance welding to said shape. The angle is held in place by spring detents, spring-friction of body, or magnet (not shown).

A similar mating bus bar, distributor, and welding head with a synchronizing mechanism for opposed die-blocks is located on the underside of the upper fixed platen 30. As distributed elsewhere, on raising of the lower platen 39, current flows through the welding heads 31 and 49 and the three contacting pieces of steel 35 and 10 and 35 to weld same into a single unit. Although not shown in detail, various suitable types of insulation will be provided at all required points to prevent short circuiting and shunting of the current. Non-magnetic materials will be introduced where required and the apparatus will be grounded.

FIGURE 4 shows a cross-sectional detail of the plural bus bars 50 slidably keyed 58 to the upper platen, with the transversely adjustable head 31 keyed 60 to said bus bars by the body clamps 65 and with the adjusting shaft 61 threaded through said body clamps 65. The connection angle is shown nested in a transverse slot in the head.

FIGURE 5 shows a detail of the sprung multiple-leaf knuckle connection 45 of transformer 29 gripping the vertically movable terminal post 46 of the lower welding mechanism.

FIGS. 6 and 7 show a plan and cross-section of the current distributor 47 having eight equally-spaced lugs or cam-like contact spots 66 located on the perimeter of same. The conducting projections 67 of the oppositely located bus bars 41 are located above the centerline of the distributor, whereby no two bus bars are in full contact with the distributor lugs simultaneously. To provide equal opposite thrusts against the distributor 47, non-conducting bearing inserts 68 are provided in the ends of the bus bars. These inserts 68 may be extended to provide full balanced pressure at all times with smoother running and reduction of vibration. In operation, as one lug rotates beyond full contact with its assigned bus bar the next lug feeds a small part of the current to another localized circuit through the steel elements. As the current diminishes through the former circuit, the current increases to full strength in the latter. The intermittent pulsating current thus produced gradually heats the steel to a welding temperature, avoiding splitting of the metal.

FIG. 8 schematically shows the primary winding 69 around the steel core 70 of the transformer 29, with a heavy secondary conductor 71 looped about said core conducting the induced low voltage welding current through the distributors 47 and 51, bus bars 50 and 41, welding heads 31 and 49, and the three contacting steel elements 35 and 10 and 35. The lettered elements of the distributor lugs and the sectionalized and insulated elements of the bus bars and welding heads correspond with the letters of FIGURES 6 and 7. The numerical subscripts of said lettered parts consecutively trace the path of the current through said elements to the terminals of the transformer, from where the heavy secondary conductor 71 completes the circuit through the transformer 29.

FIGURE 9 shows the plural contacting lugs 72 of the welding head 49. These lugs spaced closely together, but without contact, will in effect produce a continuous weld 73 as shown in FIG. 11 with a minimum instantaneous current demand.

FIGURE 10 shows an additional spot welding attachment 74 connected to the near section of the welding head 49 that will create a stitch weld 75 near the center of the connection angle 35 as shown in FIG. 11. Such stitch or spot welds are required to prevent buckling of the contact leg of the connection angle 35 and to minimize column action in same.

FIGURE 11 shows one end of the completed structural member with the dual connection angles welded in place.

Refer also to co-pending application Ser. No. 249,205, now Patent No. 3,257,540.

While various changes may be made in the detail construction, it shall be understood that such changes shall be within the spirit and scope of the present invention, as defined by the appended claims.

What I claim as new and desire to protect by Letters Patent of the United States is:

1. A multiple-spot contact resistance welder comprising, a transformer and operating console controlling primary and secondary welding circuits and timing, pressure and sequences, electric current, a vertical C frame having a projecting upper platen over a projecting base, a lower elevatable platen vertically guided and aligned under said upper platen, upper fixed bar leg of welding circuit conductor journaling a rotatable gear-equipped conductor shaft mounting a multiple layer of current-distributing cams with the projecting lugs of said cams radially spaced to alternately and consecutively feed the welding current equally to dual sets of sandwiched transverse insulated bus bars, dual transversely-spaceable multiple-layer insulated welding die-blocks contacting said bus bars, isolated raised spots on each of said die-block layers, one of said die-block layers having a slot to carry a dual connection angle, said lower platen having a similar mating inverted circuit mechanism of said die-blocks, bus bars, distributing cams and gear equipped shaft journalled in a vertical bar slidably contacting a current-conducting knuckle secured to the lower opposite leg of the welding circuit at the transformer case, a motor-driven synchronized shaft driving the said dual cam-distributor shafts by insulated gears, powered platen elevating means, whereby the lower platen holding a dual connection angle of any length in the paired die-blocks being elevated against a web of an intermediately placed structural shape raising the said web against a similar connection angle held in the paired upper die-blocks, whereupon the welding circuit is energized and current distributors are rotated to effect multiple isolated matched spot welds between the four flat surfaces of the three steel work pieces, creating plural compound-chain spot welds by a series-circuit in various patterns and plural rows.

2. A multiple-spot contact resistance welder as in claim 1 further comprising, a coordinated opposite-hand dual welder slidably mounted for variable spacing on a common aligning track and powered welder-moving shaft threaded through the base of said mobile welder, whereby said dual connection-angles may be welded to the web of said shape at each end in a single handling of the work material to produce a completely fabricated structural beam of any length.

References Cited
UNITED STATES PATENTS 1,525,626  2/1925  Taylor _____ 219—161

RICHARD M. WOOD, *Primary Examiner.*

ANTHONY BARTIS, *Examiner.*

B. A. STEIN, *Assistant Examiner.*